United States Patent
Goldberg et al.

(10) Patent No.: US 7,058,655 B2
(45) Date of Patent: Jun. 6, 2006

(54) DETERMINING OBJECT GRAPH AND OBJECT GRAPH PROJECTION

(75) Inventors: Robert N. Goldberg, Emerald Hills, CA (US); Peter A. Yared, San Francisco, CA (US); Bruce K. Daniels, Capitola, CA (US); Yury Kamen, Foster City, CA (US); Syed M. Ali, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 473 days.

(21) Appl. No.: 10/044,927

(22) Filed: Jan. 11, 2002

(65) Prior Publication Data
US 2003/0135503 A1    Jul. 17, 2003

(51) Int. Cl.
*G06F 17/00* (2006.01)
(52) U.S. Cl. .................. 707/103 R; 707/100; 707/102
(58) Field of Classification Search ...... 707/100–104.1
See application file for complete search history.

(56) References Cited

U.S. PATENT DOCUMENTS

| 5,499,371 | A |  | 3/1996 | Henninger et al. |
| 5,615,362 | A |  | 3/1997 | Jensen et al. |
| 5,706,506 | A |  | 1/1998 | Jensen et al. |
| 5,893,108 | A | * | 4/1999 | Srinivasan et al. ..... 707/103 R |
| 5,991,771 | A | * | 11/1999 | Falls et al. ................. 707/202 |
| 6,063,128 | A | * | 5/2000 | Bentley et al. ............. 345/964 |
| 6,078,926 | A |  | 6/2000 | Jensen et al. |
| 6,169,992 | B1 | * | 1/2001 | Beall et al. ............ 707/103 R |
| 6,286,010 | B1 | * | 9/2001 | Ramachandran et al. ...................... 707/103 R |
| 6,349,333 | B1 | * | 2/2002 | Panikatt et al. ............. 709/223 |
| 6,675,261 | B1 | * | 1/2004 | Shandony ................... 711/121 |
| 2001/0034733 | A1 | * | 10/2001 | Prompt et al. .............. 707/102 |
| 2002/0116412 | A1 | * | 8/2002 | Barnes et al. ............... 707/513 |
| 2003/0110073 | A1 | * | 6/2003 | Briel et al. .................... 705/10 |

* cited by examiner

*Primary Examiner*—Jean Corrielus
*Assistant Examiner*—Anh Ly
(74) *Attorney, Agent, or Firm*—Osha Liang LLP

(57) ABSTRACT

A method for generating a projected graph data structure, including generating a request for the projected graph data structure using a variable usage specification, retrieving a server graph data structure using the request, generating a projected graph data structure representation using the request, the server graph data-structure, and a schema associated with the server graph data-structure, and instantiating the projected graph data-structure using the projected graph data-structure representation.

12 Claims, 5 Drawing Sheets

DETERMINING OBJECT GRAPH AND OBJECT GRAPH PROJECTION

BACKGROUND OF INVENTION

An "object graph" is a collection of related objects which are represented in forms including binary, text, XML ("Extensible Markup Language"), etc. FIG. 1 illustrates a class schema. The class schema 3 represents the classes that may be present in a given object graph, attributes associated with the classes, the relationships between the classes, and associated accessors. Further, the class schema 3 encapsulates the class definitions necessary to create the class. For example, the class schema in FIG. 1 contains a Purchase_Order class 2 with a PURCHASE_ORDER_ID attribute. The Purchase_Order class 2 is related to a LineItem class 4—with a one-to-many relationship. Further, the Purchase_Order class 2 contains an accessor, LineItems, for the relationship to the LineItem class 4. The LineItem class 4 contains a LINEITEM_ID attribute, a QUANTITY attribute, and a DISCOUNT attribute. Further, the LineItem class 4 contains an accessor, Product, for the relationship to the Product class 6, and an accessor, Purchase_Order, for the relationship to the Purchase_Order class 2. The LineItem class 4 is related to a Product class 6 with a one-to-one relationship. The Product class 6 contains a PRODUCT_ID attribute, a NAME attribute, and a PRICE attribute.

The class schema 3, illustrated in FIG. 1, may be used to create numerous object graphs that conform to the class schema. For example, FIG. 2 illustrates an exemplary object graph 8 that conforms to the class schema (3 in FIG. 1). The object graph 8 contains a Purchase_Order_Object_1 10 that contains a PURCHASE_ORDER_ID attribute. The Purchase_Order_Object_1 10 is related to three LineItem objects 11, 12, and 13. As specified by the class schema 3, each LineItem object 11, 12, and 13 contains a LINEITEM_ID attribute, a NAME attribute and a PRICE attribute. Each LineItem object 11, 12, 13 is related to one Product object. For example, LineItem_Object_1 13 is related to Product_Object_1 14, LineItem_Object_2 12 is related to Product_Object_2 15, and LineItem_Object_3 11 is related to Product_Object_2 15. As specified by the class schema 3, each Product object 14, 15 contains a PRODUCT_ ID attribute, a NAME attribute, and a PRICE attribute. The Purchase_Order_Object_1 10 may be called the root of the object graph 8 because the Purchase_Order_Object_1 10 (explicitly or implicitly) references all objects in the object graph 8 and is the entry point into the object graph 8.

As shown in FIG. 2, objects typically include a wealth of data and behavior corresponding to the union of all possible applications of the data. As such, object graphs can be quite large. Relational database management systems (RDBMS) allow for the partial retrieval of data corresponding to an object. Retrieval of part of the object, e.g., part of a table row, is called a projection. There are difficult to solve problems related to using projected object graphs. For example, a method defined on an object may require certain attributes, and, thus, if not all the attributes are retrieved, some methods may fail or produce incorrect results. In this case, sending the entire object graph shown in FIG. 2 would be inefficient when all that is really needed is a small portion of the object graph.

As an example, FIG. 3 illustrates a projected version of the object graph 8 that is actually needed by a client process. Note that only a few of the attributes shown in FIG. 2 are needed by the client process. In this case, it would be inefficient to send the large object graph shown in FIG. 2 when all that is really needed is the small object graph shown in FIG. 3.

Still referring to FIG. 3, the subset of object graph 8', includes the primary key for each object within the object graph, e.g., the primary key for the Purchase_Order_Object_1 10' is "PURCHASE_ORDER_ID." Additionally, some objects also include a secondary key. Typically, object graphs require that objects within the graph all include their primary key. Depending on the database requirements, the secondary key may also be required.

In addition, if part of an object is fetched in one transaction, and the rest in another transaction, the two parts may be inconsistent with each other. Because these sorts of problems are difficult to solve, systems that use objects typically fetch the entire object graph. The most innovative systems define groupings of attributes as part of the object schema. This requires the application developer to guess which groups will be needed in the future and to insert this information into the application manually. Unless the proper groups exist in the schema, the results may not be optimal.

SUMMARY OF INVENTION

In general, in one aspect, the invention relates to a method for generating a projected graph data structure, comprising: generating a request for the projected graph data structure using a variable usage specification, retrieving a server graph data structure using the request, generating a projected graph data structure representation using the request, the server graph data-structure, and a schema associated with the server graph data-structure, and instantiating the projected graph data-structure using the projected graph data-structure representation.

In general, in one aspect, the invention relates to a method for generating a projected graph data-structure, comprising generating a request for the projected graph data-structure using a usage variable specification, retrieving a server graph data-structure using the request, generating a projected graph data-structure representation using the request, the server graph data-structure, and a schema associated with the server graph data-structure, instantiating the projected graph data-structure using the projected graph data-structure representation, and synchronizing projected objects located on the client with distributed objects located on a server.

In general, in one aspect, the invention relates to a network system, comprising a customer component that generates a request for a projected object graph, a service component that generates a service-side projected object graph representation, means for generating the request for the projected graph data-structure using a usage variable specification, means for retrieving a server graph data-structure using the request, means for generating the projected graph data-structure representation using the request, the server graph data-structure, and a schema associated with the server graph data-structure, and means for instantiating the projected graph data-structure using the projected graph data-structure representation.

In general, in one aspect, the invention relates to an apparatus for generating a projected graph data-structure, comprising means for generating a request for the projected graph data-structure using a usage variable specification, means for retrieving a server graph data-structure using the request, means for generating a projected graph data-structure representation using the request, the server graph data-structure, and a schema associated with the server graph data-structure, and means for instantiating the projected graph data-structure using the projected graph data-structure representation.

Other features and advantages of the invention will be apparent from the following description and the appended claims.

DETAILED DESCRIPTION

Figure 1:
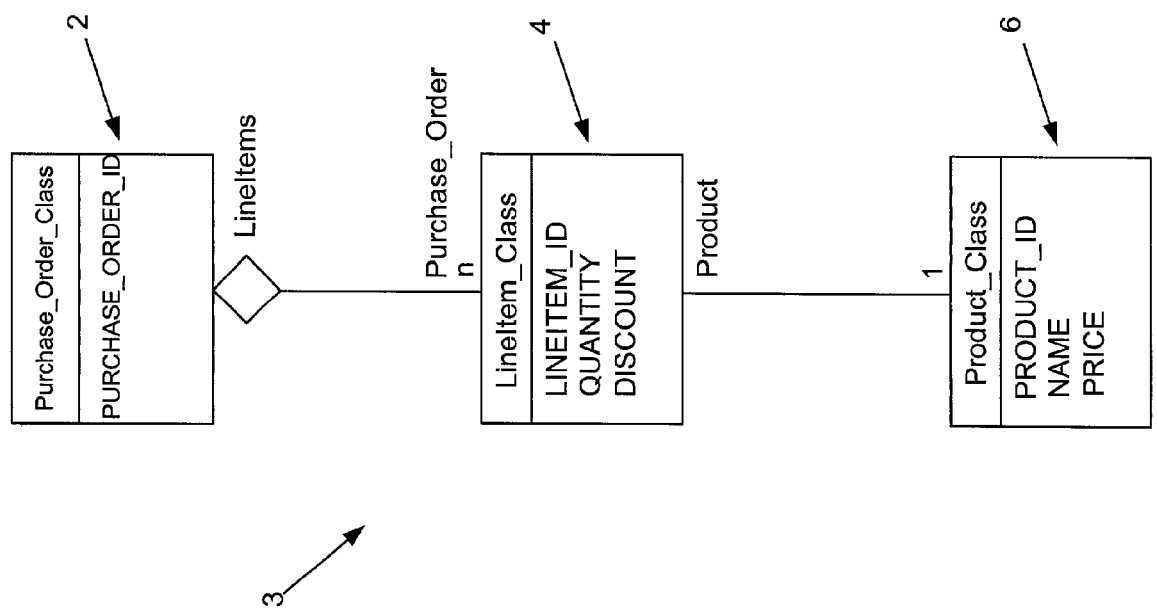
FIG. 1 illustrates a class schema.

Exemplary embodiments of the invention will be described with reference to the accompanying drawings. Like items in the drawings are shown with the same reference numbers.

The following is a detailed description of specific embodiments of the invention. In the following detailed description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A projection generation system consistent with the embodiments of the present invention generates object graph projections optimized for a distributed application. The projection generation system bases object graph projection on application usage specifications rather than object schemas. A variable usage specification (VUS) describes the application as a series of states and transitions. The states represent information derived from objects. The transitions represent business logic and operations that occur between any two given states. For example, a state might correspond to a single screen displayed to an end-user of a client process. Transition between states is typically caused by a user-gesture, such as pressing a key, moving a mouse, etc. In the context of a web application, for example, web pages are states, and transitions are the buttons/actions on the web pages that take the user to a different page (or state). The projection generation system restricts calling of remote business methods to transitions between states. The VUS also includes consistency requirements for each datum. The VUS may be provided by the programmer or generated dynamically by the client.

Figure 2:
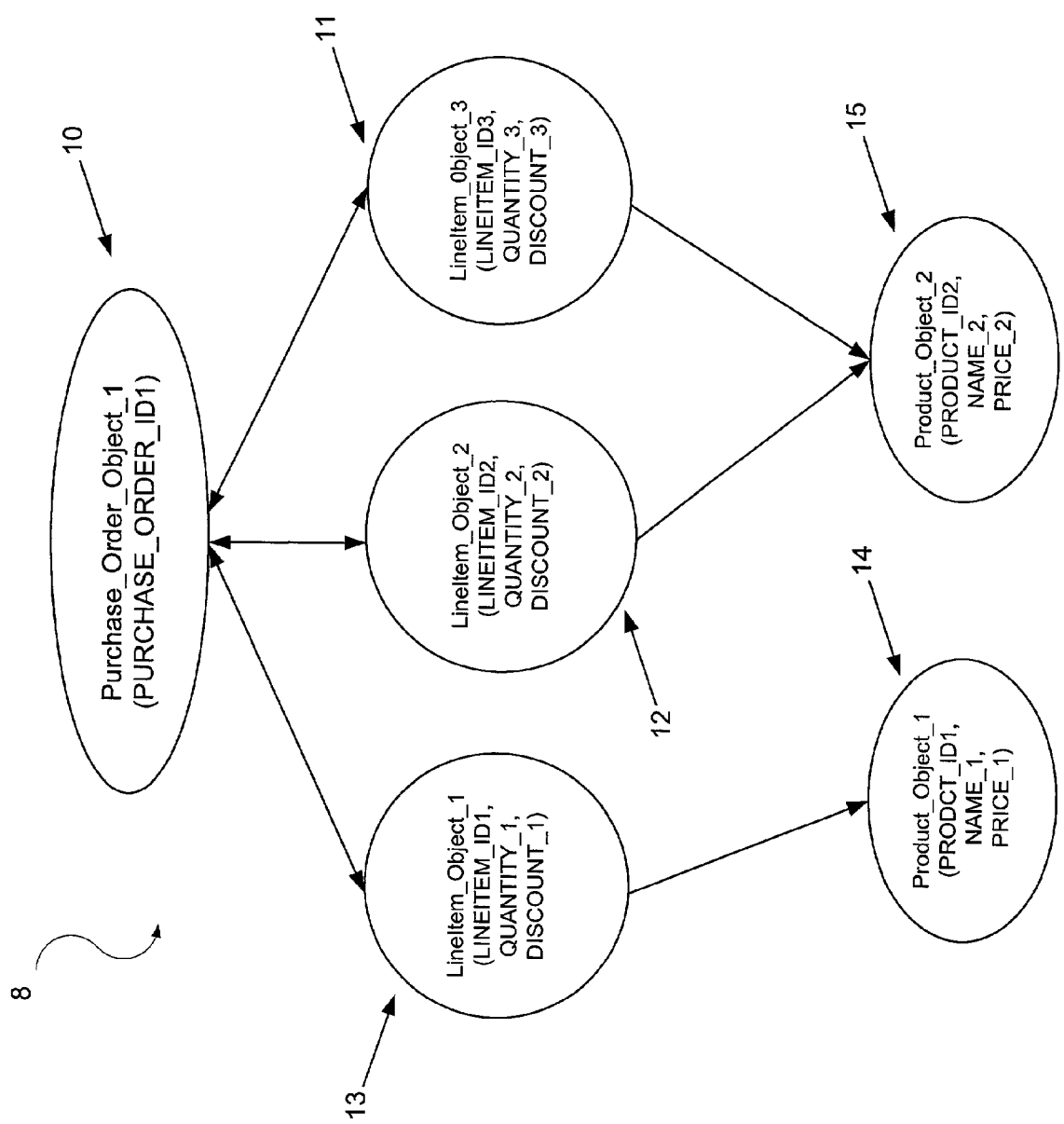
FIG. 2 illustrates an exemplary object graph created using the class schema of FIG. 1.
Figure 3:
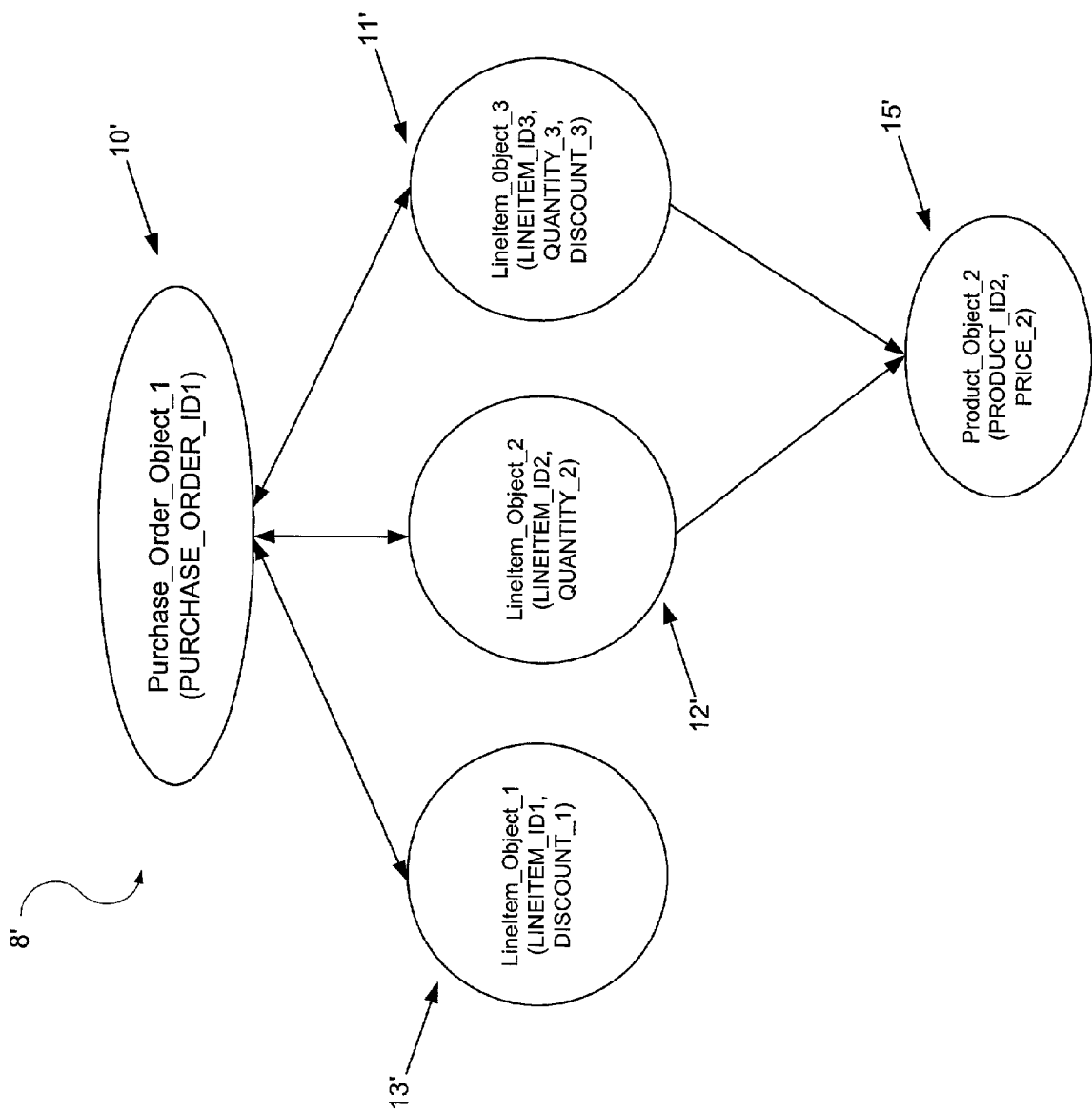
FIG. 3 illustrates an exemplary projected object graph of FIG. 2.

For illustration purposes, Table 1 shows an example of the VUS based on the object graph 8 (shown in FIG. 2). It should be noted that there are a variety of ways of representing the VUS, and the format shown in Table 1 is not intended to limit the invention in any way. The VUS references the portions of the object graph 8 (shown in FIG. 2) that are of interest. The references are made relative to the root of the object graph 8 (shown in FIG. 2), which is the Purchase_Order_Object_1 (10 in FIG. 2). Note that the VUS shown in Table 1 corresponds to the object graph 8' (as illustrated in FIG. 3) which is the projected version of the object graph 8 shown in FIG. 2.

TABLE 1

Variable Usage Specification

Purchase_Order.PURCHASE_ORDER_ID
Purchase_Order.LineItems[1].LINEITEM_ID
Purchase_Order.LineItems[1].DISCOUNT
Purchase_Order.LineItems[2].QUANTITY
Purchase_Order.LineItems[3].DISCOUNT
Purchase_Order.LineItems[3].QUANTITY
Purchase_Order.LineItems[3].Product.PRODUCT_ID
Purchase_Order.LineItems[3].Product.PRICE The projection generation system automatically generates projected object graphs, where in one embodiment, the projected object graph corresponds to an object graph only populated with objects and attributes that are required for a particular state. The attributes in the project object graph may be accessed via accessors and mutators, where in one embodiment, an accessor may be a get method and a mutator may be a set method.

For each state of the application, the projection generation system fetches and locally caches the objects required to represent the state. The projection generation system determines what objects and corresponding attributes are required for each state based on the VUS. The objects are cached as projected objects and may be accessed locally by a client process. Before a remote method is invoked on the server, the projection generation system synchronizes the projected objects, located on a client, with the corresponding distributed objects in the server. In this way, the projection generation system ensures that all the attributes required for a particular state are available.

Figure 4:
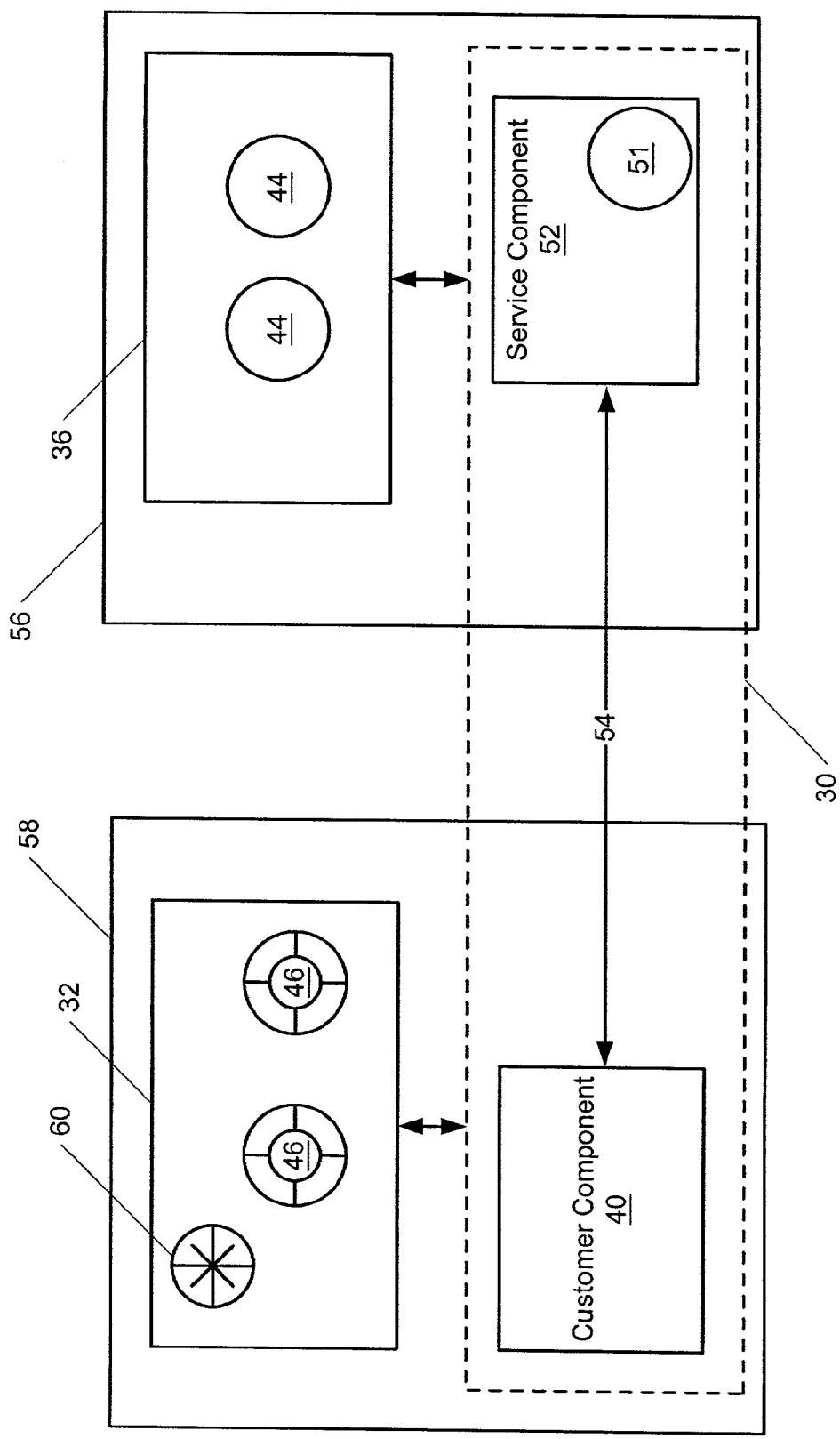
FIG. 4 shows a projection generation system, in accordance with one embodiment of the invention.

FIG. 4 shows a projection generation system 30 according to one embodiment of the invention, in one environment in which it may be used. A projection generator 30 is positioned between a client component 32 located on a client 58, and a server component 36 located on a server 56. As a result, the client component 32 is modified such that requests normally made to the server component 36 now go to the projection generator 30. This modification allows the projection generator 30 to perform various object graph projection services. The projection generator 30 has a customer component 40 that interacts with the client component 32, and a service component 52 that interacts with the server component 36. The customer component 40 and the service component 52 of the projection generator 30 communicate over the network link 54.

The customer component 40 intercepts calls from the client component 32 in order to automatically optimize object graph projection. At runtime, the customer component 40 determines the states and the transitions in the application. A state may correspond to information displayed to an end user, e.g., using a web browser. In order to generate the information to display to the end-user, the client component 32 may require data from one or more server object graphs 44 (8 in FIG. 2) in the server component 36. A transition may correspond to one or more business method calls required to move the application from one state to another. Typically, the transition is initiated through user gestures, such as clicking a mouse or hitting a key. The customer component 40 determines what portions of the server object graphs 44 are required for the current state of the application, based on the VUS. The required objects include at least one object from the server object graph 44 and a distributed business object 60, where in one embodiment the distributed business object contains the business logic of the application. The customer component 40 then fetches the data from the server based on this information. In addition, the customer component 40 synchronizes the projected object graphs 46 used in the current state with the corresponding server object graphs 44 in the server component 36. This ensures that the required server object graph attributes contain the correct information. The customer component 40 may be implemented as a runtime library that includes a set of routines that are bound to the client, e.g., client component 32, at runtime.

As shown in FIG. 4, the service component 52 receives requests from the customer component 40 to retrieve particular portions of a server object graph 44, corresponding server object graph attributes, and distributed business objects 60 from the server component 36. The service component retrieves entire server object graph 44 (e.g., 8 in FIG. 2) and creates a service-side projected object graph representation 51 based on the particular attributes requested by the customer component 40. Additionally, the service component 52 provides application-independent services to the customer component 40, such as forwarding requests from an invoking method call to a server object graph 44 in the server component 36.

In one embodiment of the present invention, the service-side projected object graph representation is represented as an Extensible Mark-up Language (XML) document.

In one embodiment of the present invention, the service-side projected object graph representation is represented as a serialized file. The file may be created using an application programming interface (API) such as the Java™ Serialization API.

In one embodiment of the present invention, the service-side projected object graph representation is represented as a hash table.

In one or more embodiments of the present invention, the service component contains functionality to handle referential loops, and handle reference to the same object within an object graph. This functionality is used during generation of the service-side projected object graph representation. In one embodiment, the service component uses a table to handle referential loops and references to the same object. As the service component traverses through the server object graph to create the service-side projected object graph representation, each object that is encountered is entered into the table. If the encountered object is already in the table, then it is not reprocessed. This process is repeated until all required objects within the object graph have been processed.

To the client component 32, the customer component 40 is a local representation of the server component 36. The client component 32 interacts with the customer component 40 and projected object graphs 46 just as it would with the server component 36 and server object graphs 44.

In order to take advantage of the projection generator 30, an application is described as a series of states and transitions. The states represent the information (derived from objects) sent to a web browser. The transitions represent the business logic and operations that occur between any two given states. The description of the application also includes the consistency requirements for each datum.

Additionally, the client component 32 is able to route calls that would normally be made to the server component 36 to be made to the customer component 40. Such calls may include calls for creating, finding, or destroying server object graphs in the server component 36, calls for accessing data stored in server object graphs in the server component 36, and calls for changing data stored in server object graphs in the server component 36.

Figure 5:
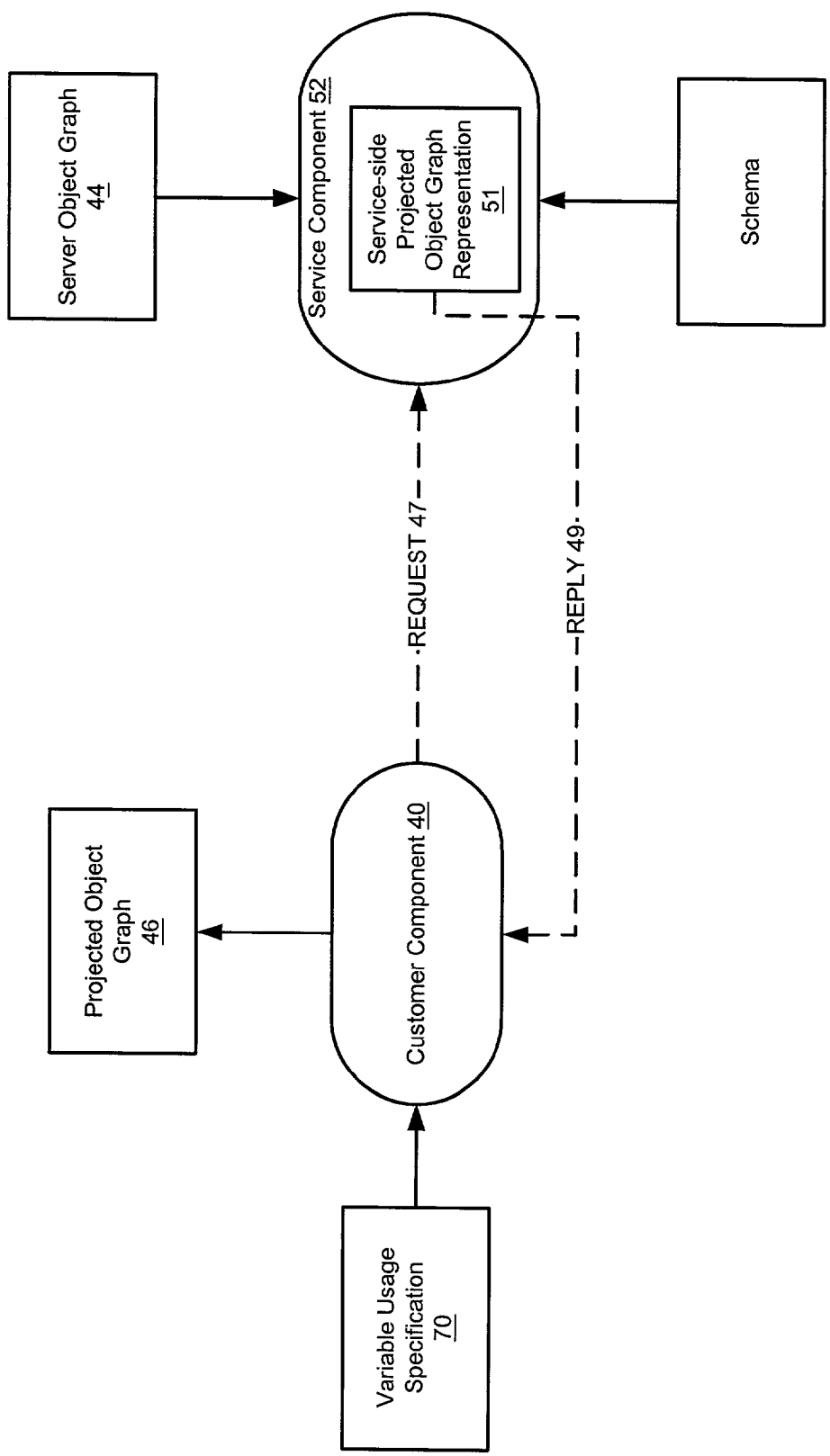
FIG. 5 illustrates a flow diagram, in accordance with one embodiment of the invention.

FIG. 5 illustrates a flow diagram, which describes one embodiment of the invention. During the typical operation of the projection generator 30, the customer component 40 obtains a requested state from the client component 32, where in one or more embodiments of the present invention, the requested state is the state to which the application is transitioning. Subsequently, the VUS 70, which may be provided by the programmer or dynamically generated by the client, is sent to the customer component 40. With the aforementioned input, the customer component 40 determines the server object graph attributes and methods that are required and sends a request 47 to the service component 52. The server object graph 44 is obtained from a persistent data store (not shown), where, in one or more embodiments of the present invention, the server object graph 44 is a complete object graph containing all object graph attributes and methods, e.g., 8 in FIG. 2, and is it fetched directly by the service component 52. The service component 52, in one or more embodiments of the invention, combines the input from the customer component 40 and the server object graph 44 to generate a service-side projected object graph representation 51, e.g., an object graph representation corresponding to 8' in FIG. 3. The service-side projected graph representation 51 is then forwarded via a replay 49 to the customer component 40. The customer component receives the service-side projected object graph representation 51 and uses it to instantiate a projected object graph 44.

In one embodiment of the present invention, the projected object graph located on the customer component is synchronized with the corresponding server object graph on the server component prior to generating a service-side projected object graph representation.

Advantages of the present invention may include one or more of the following. The projection generation system verifies and retrieves all specified data for a given state at every transition, allowing for client objects to execute with only a sparsely populated object graph, e.g., FIG. 2. The projection generation system allows distributed applications to be automatically optimized by allowing client objects to execute with minimal information, and minimizing the amount of data that is required to be transferred from the server to the client. The projection generation system ensures client components of distributed applications always contain just the current information when entering a new state. Further, the projection generation system allows programs to increase efficiency in bandwidth usage, time usage, communication cost, processes time, etc. Further, the flexible nature of the projection generation system allows it to be used in thin clients, e.g., Personal Digital Assistants (PDAs). Those skilled in the art will appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method for generating a projected object graph, comprising:

generating a request for the projected object graph using a variable usage specification;

retrieving a server object graph using the generated request;

generating a service-side projected graph data structure representation using the generated request, the server object graph, and a schema associated with the server object graph; and instantiating the projected object graph using the service-side projected graph data structure representation, wherein the variable usage specification comprises a plurality states and at least one transition for an application, wherein each of the plurality of states comprises a list of required objects and object attributes, wherein the at least one transition, comprises business logic to transition the application from one state of the plurality of states to another state of the plurality of states, and wherein the service-side projected graph data structure representation is represented using a hash table.

2. The computer implemented method of claim 1, further comprising:

synchronizing projected objects in the projected object graph located on the client with distributed objects in the server object graph located on a server.

3. The computer implemented method of claim 1, wherein the service-side projected graph data structure representation comprises an Extensible Mark-up Language document.

4. The computer implemented method of claim 1, wherein the service-side projected graph data structure representation comprises a serialized file.

5. The computer implemented method of claim 1, wherein the server object graph is located in a persistent data store.

6. A computer implemented method for generating a projected object graph, comprising:

generating a request for the projected object graph using a usage variable specification;

retrieving a server object graph using the generated request;

generating a service-side projected graph data structure representation using the generated request, the server object graph, and a schema associated with the server object graph;

instantiating the projected object graph using the service-side projected graph data structure representation; and synchronizing projected objects in the projected object graph located on the client with distributed objects in the server object graph located on a server, wherein the variable usage specification application comprises a plurality states and at least one transition for an application, wherein each of the plurality of states comprises a list of required objects and object attributes, wherein the at least one transition comprises business logic to transition the application from one state of the plurality of states to another state of the plurality of states, and wherein the service-side projected graph data structure representation is represented using a hash table.

7. A computer network system, comprising:

a customer component that generates a request for a projected object graph;

a service component that generates a service-side projected object graph representation;

means for generating the generated request for the projected object graph using a variable usage specification;

means for retrieving a server object graph using the generated request;

means for generating the service-side projected graph representation using the generated request, the server object graph, and a schema associated with the server object graph; and means for instantiating the projected object graph using the service-side projected graph data structure representation, wherein the variable usage specification comprises a plurality states and at least one transition for an application, wherein each of the plurality of states comprises a list of required objects and object attributes, wherein the at least one transition comprises business logic to transition the application from one state of the plurality of states to another state of the plurality of states, and wherein the service-side projected graph data structure representation is represented using a hash table.

8. The computer network system of claim 7, further comprising:

means for synchronizing projected objects in the projected object graph located on the client with distributed objects in the server object graph located on a server.

9. The computer network system of claim 7, wherein the service-side projected graph data structure representation comprises an Extensible Mark-up Language document.

10. The computer network system of claim 7, wherein the service-side projected graph data structure representation comprises a serialize file.

11. The computer network system of claim 7, wherein the server object graph is located in a persistent data store.

12. The computer network system of claim 7, wherein the customer component and the service component communication over a network link.

* * * * *